United States Patent
Pabst et al.

(10) Patent No.: US 9,954,279 B1
(45) Date of Patent: Apr. 24, 2018

(54) TEST SYSTEM AND TEST METHOD

(71) Applicant: Rohde & Schwarz GmbH & Co. KG, München (DE)

(72) Inventors: Alexander Pabst, Taufkirchen (DE); Corbett Rowell, München (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 15/622,631

(22) Filed: Jun. 14, 2017

(51) Int. Cl.
| | |
|---|---|
| *H04B 17/00* | (2015.01) |
| *H01Q 3/26* | (2006.01) |
| *H04K 3/00* | (2006.01) |
| *H04B 17/10* | (2015.01) |
| *H01Q 25/00* | (2006.01) |

(52) U.S. Cl.
CPC ............. *H01Q 3/267* (2013.01); *H01Q 25/00* (2013.01); *H04B 17/0085* (2013.01); *H04B 17/102* (2015.01); *H04K 3/94* (2013.01)

(58) Field of Classification Search
CPC .. H04B 17/102; H04B 17/0085; H01Q 3/267; H01Q 25/00; H04K 3/94
See application file for complete search history.

(56) References Cited

U.S. PATENT DOCUMENTS

| | | | | |
|---|---|---|---|---|
| 5,311,116 A * | 5/1994 | Rogers | ................. | G01R 31/002 324/627 |
| 5,926,135 A * | 7/1999 | Minkoff | .................... | G01S 3/10 342/17 |
| 8,055,184 B1 * | 11/2011 | DiMartino | ............. | G06Q 20/40 235/380 |
| 8,811,461 B1 * | 8/2014 | Huynh | ................... | H04B 17/00 375/224 |
| 9,698,479 B2 * | 7/2017 | Gregoire | .................. | H01Q 3/34 |
| 2006/0055592 A1 * | 3/2006 | Leather | ................ | G01R 29/105 342/174 |
| 2009/0222173 A1 * | 9/2009 | Wisniowski | ......... | H01Q 1/3208 701/49 |
| 2010/0105403 A1 * | 4/2010 | Lennartson | .......... | H01Q 3/2605 455/450 |
| 2010/0207827 A1 * | 8/2010 | Oh | ......................... | G01R 29/10 343/703 |
| 2010/0297953 A1 * | 11/2010 | Rofougaran | ......... | H04B 7/0689 455/73 |
| 2011/0269396 A1 * | 11/2011 | Beeler | ................ | H04B 7/18515 455/9 |

(Continued)

*Primary Examiner* — Dominic Rego
(74) *Attorney, Agent, or Firm* — Westman, Champlin & Koehler, P.A.

(57) ABSTRACT

A test system for testing a device under test comprising an antenna array with multiple antennas and capable of controlling a radiation pattern of the antenna array, may comprise a test antenna system for emitting outgoing test signals to the device under test and receiving incoming test signals from the device under test, a control unit for controlling the device under test to set a first radiation pattern with a theoretical main lobe pointing to the test antenna system or to set a second radiation pattern with a main lobe comprising an angle larger than 0° with the main lobe of the first radiation pattern, and a test processing unit for evaluating the device under test based on signal levels of incoming test signals received by the test antenna system from the device under test and/or based on signal levels of outgoing test signals as received by the device under test.

16 Claims, 5 Drawing Sheets

(56) References Cited

U.S. PATENT DOCUMENTS

| | | | |
|---|---|---|---|
| 2011/0306306 A1* | 12/2011 | Reed | H04B 17/0085 455/67.11 |
| 2012/0225624 A1* | 9/2012 | Kyosti | H01Q 3/2605 455/67.11 |
| 2013/0052962 A1* | 2/2013 | Hansen | G01R 29/0871 455/67.12 |
| 2013/0093447 A1* | 4/2013 | Nickel | H04W 24/06 324/750.16 |
| 2013/0141287 A1* | 6/2013 | Pallonen | G01R 29/105 343/703 |
| 2014/0266929 A1* | 9/2014 | Huynh | G01R 29/10 343/703 |
| 2014/0269871 A1* | 9/2014 | Huynh | H04B 1/38 375/224 |
| 2014/0273873 A1* | 9/2014 | Huynh | H04B 17/008 455/67.12 |
| 2014/0300519 A1* | 10/2014 | Estebe | H01Q 3/267 343/703 |
| 2015/0116155 A1* | 4/2015 | Chibane | H01Q 1/1257 342/372 |
| 2015/0116164 A1* | 4/2015 | Mannion | G01R 29/10 343/703 |
| 2016/0088498 A1* | 3/2016 | Sharawi | G01R 29/10 370/241 |
| 2016/0097847 A1* | 4/2016 | Loesch | G01S 13/42 342/156 |
| 2016/0226607 A1* | 8/2016 | Tankielun | H04W 24/10 |
| 2017/0089953 A1* | 3/2017 | Liang | H04N 17/004 |
| 2017/0115334 A1* | 4/2017 | Symes | G01R 29/105 |
| 2017/0127294 A1* | 5/2017 | Ui | H04B 7/0695 |
| 2017/0155456 A1* | 6/2017 | Wennerlof | H04B 17/12 |
| 2017/0160310 A1* | 6/2017 | Isaac | G01R 1/045 |
| 2017/0223559 A1* | 8/2017 | Kong | H04W 24/02 |

* cited by examiner

TEST SYSTEM AND TEST METHOD

TECHNICAL FIELD

The present invention relates to a test system for testing a device under test comprising an antenna array. The present invention further relates to a corresponding test method.

BACKGROUND

Although applicable in principle to any system that comprises an antenna array, the present invention and its underlying problem will be hereinafter described in combination with antennas for mobile communication systems.

In modern wireless communication systems and devices, data is no only transmitted via a single antenna or a single wireless signal. Instead, multiple antennas may be provided in the wireless devices and multiple wireless signals may be used concurrently to transmit data in parallel.

However, the use of parallel wireless signals requires specific capabilities in the wireless devices, like e.g. user equipment or base stations. One of the required capabilities is a beamforming and/or -steering capability of the antennas of the wireless devices. An antenna that is capable of performing beamforming and/or -steering may e.g. direct the emitted beams or radio waves into a controllable direction, at least within a given angle range. Usually, a plurality of small antenna elements will be united in an antenna array and the beamsteering is performed by changing or tuning the relative phases of the signals for the single antenna elements.

During production of wireless devices thorough testing of the single wireless devices is required to ensure that the single wireless devices comply with legal and/or standards regulations.

Such tests may e.g. be performed with a VSWR (voltage standing wave ratio) tester or meter by performing a respective phase scan. However, especially for antenna arrays with a large number of antenna elements, such tests may last up to 15 minutes or more.

Against this background, the problem addressed by the present invention is providing an improved testing of antennas.

SUMMARY

The present invention solves this object by a test system with the features of claim 1 and by a test method with the features of claim 10.

Accordingly it is provided:

A test system for testing a device under test comprising an antenna array with multiple antennas and capable of controlling a radiation pattern of the antenna array, the test system comprising a test antenna system for emitting outgoing test signals to the device under test and receiving incoming test signals from the device under test, a control unit for controlling the device under test to set a first radiation pattern with a theoretical main lobe pointing to the test antenna system or to set a second radiation pattern with a main lobe of the second radiation pattern comprising an angle larger than 0° (zero degree) to the main lobe of the first radiation pattern, and a test processing unit for evaluating the device under test based on signal levels of incoming test signals received by the test antenna system from the device under test and/or based on signal levels of outgoing test signals as received by the device under test.

Further, it is provided:

A test method for testing a device under test comprising an antenna array with multiple antennas and capable of controlling a radiation pattern of the antenna array, the test method comprising emitting outgoing test signals to the device under test and/or receiving incoming test signals from the device under test with a test antenna system, controlling the device under test to set a first radiation pattern with a theoretical main lobe pointing to the test antenna system or to set a second radiation pattern with a main lobe of the second radiation pattern comprising an angle larger than 0° with the main lobe of the first radiation pattern, and evaluating the device under test based on signal levels of incoming test signals received by the test antenna system from the device under test and/or based on signal levels of outgoing test signals as received by the device under test.

The present invention is based on the fact that measuring signals, e.g. the signal strength and phase, of every single antenna element of an antenna pattern is a very time consuming task.

In addition, the present invention makes use of the finding that an antenna array may be evaluated based on two or more characteristic measurements with different beam configurations of the antenna that allow assessing the antenna characteristics.

The present invention may therefore be especially applied to test devices that comprise antenna arrays with controllable beam characteristics. Such array antennas may be referred to as antenna with beamsteering capabilities and may comprise at least two antenna elements. Further, such devices under test will usually comprise at least one signal generation unit that allows controlling the phases of the signals that are provided to the single antenna elements. By specifically controlling the phases, the beamsteering characteristic of the antenna may be configured as required. If for example no phase shift is introduced in the signals that are fed to the single antenna elements, the beam will be emitted in a direction vertical or perpendicular to the plane in which the antenna elements are provided, i.e. the antenna plane. By adding an increasing phase shift to the signals for the single antenna elements, the beam may be steered out of the normal of this antenna plane.

The present invention now makes use of the beam steering capabilities of such devices under test and performs two measurements or more to characterize the antenna array of the device under test.

A test antenna system is provided that may either receive incoming test signals from the device under test or emit outgoing test signals to the device under test. The test antenna system may e.g. be a single antenna. The test processing unit may e.g. be coupled to the test antenna system via a cable for receiving incoming test signals or providing outgoing test signals.

Further, the control unit may control the device under test to set a specific antenna or radiation pattern for the antenna array. The invention is specifically focused on setting a first radiation pattern with a theoretical main lobe pointing to the test antenna system. For example the test antenna system may be positioned in a vertical direction to and centered over the antenna plane. The first antenna or radiation pattern may e.g. comprise configuring no phase shifts for the single antenna elements. This means that the center of the main lobe of the radiation pattern will coincide with the position of the test antenna system. If the test antenna system is positioned at another position, the first radiation pattern may be a pattern that focuses the main lobe onto the position of the test antenna system. With the first radiation pattern set, the test processing unit may control the device under test to emit a signal and a first incoming test signal may be evaluated by the test processing unit. Alternatively or in addition, the test control unit may generate a first outgoing test signal. The device under test may then e.g. provide the received signal levels for the single antenna elements to the test processing unit for evaluation.

In addition, the present invention uses a second specific radiation pattern for evaluating the device under test. The second radiation pattern may e.g. be configured such that the main lobe of the second radiation pattern comprises an angle larger than 0° with the main lobe of the first radiation pattern. The second radiation pattern therefore rotates the main lobe out of the vertical direction regarding the antenna plane. With the second radiation pattern a signal level lower than with the first radiation pattern should be measured.

It is understood, that more than two measurements may be performed, especially for characteristic points in the radiation pattern.

It is understood, that a control and data interface may be provided to the device under test that allows controlling the device under test to set a specific antenna or radiation pattern for the antenna array and transmitting data to or receiving data from the device under test. If the device under test comprises e.g. only the antenna array analog signal lines may be provided to the antenna array, i.e. to the single elements of the antenna array. If the device under test comprises e.g. digital signal processing elements, a digital data and control interface may be provided to those signal processing elements.

The processing unit may perform the evaluation of the device under test based on predetermined or expected signal values or levels that should be measured by the test antenna system or the device under test for the two different radiation patterns.

Further embodiments of the present invention are subject of the further subclaims and of the following description, referring to the drawings.

In a possible embodiment, the second radiation pattern may comprise a theoretical null between the main lobe and a side lobe, e.g. the first side lobe, pointing to the test antenna system. A null in this context may be an area or vector in the antenna array's radiation pattern where the signal cancels out almost entirely. At the null a minimal signal level should therefore be measured. Such a minimal signal level may easily be verified.

In a possible embodiment, the test processing unit may comprise an incoming signal evaluation unit for verifying if a received first incoming test signal with the first radiation pattern set comprises a signal level within a first predefined incoming signal level range and if a received second incoming test signal with the second radiation pattern set comprises a signal level within a second predefined incoming signal level range.

The incoming signal evaluation unit may e.g. comprise a processing device that may e.g. comprise A/D converters for processing the incoming test signals received from the device under test. As an alternative, level meters may be provided that measure the signal levels of the incoming test signals and provide a respective indication to the processing device. It is understood, that this indication may be a digital signal or an analogue signal that may be received by the processing device via A/D-converters.

As an alternative, with level meters that output an analogue signal, the incoming signal evaluation unit may also comprise comparators that compare the signal levels to the predetermined threshold values.

For a known or theoretical radiation pattern the expected signal levels may be calculated for a predetermined test signal or be experimentally determined. Further, for a given radiation pattern, the positions and sizes of the main lobe, the side lobes and the nulls are known or be experimentally determined. A very simple yet effective evaluation of an antenna array may therefore be performed verifying at least two expected signal levels.

First it may be verified if the signal level at the expected maximum of the main lobe with the first radiation pattern set is within a predetermined incoming signal range. With this first test it may be tested if the main lobe is correctly positioned. If the antenna array is for example badly calibrated and phase shifts are present in signals for the single antenna elements, the main lobe may be shifted, even with the first radiation pattern set.

It may then be verified if e.g. the first null, i.e. the null between the main lobe and the first side lobe, is at the expected position. This may be tested by setting the second radiation pattern in the DUT. With the second radiation pattern set, a minimum signal level is expected to be measured at the test antenna system. Should this signal level not be as expected, e.g. higher than expected, this is an indication that either the shape of the main lobe is modified or that the radiation pattern is not rotated as expected. These errors may e.g. occur due to wrong phase shifts in the signals for the single antenna elements.

In a possible embodiment, the test processing unit may comprise an incoming signal processor coupled to the test antenna system for processing the first incoming test signal and for processing the second incoming test signal.

The test processing unit may comprise an incoming signal processor that may complement or substitute the incoming signal evaluation unit. The incoming signal evaluation unit may e.g. be implemented in the incoming signal processor at least in part. The incoming signal processor may e.g. comprise functions to perform the level determination for the first and the second incoming test signals, and compare the signal levels with the threshold values or ranges. The incoming signal processor may however perform additional evaluations or calculations on the received incoming signals.

The incoming signal processor may e.g. comprise a signal analyzer that may e.g. determine an EVM (Error Vector Magnitude), a Gain, an EiRP (Equivalent isotropically Radiated Power), an EiS (Effective Isotropic Sensitivity) and/or an ACLR (Adjacent Channel Leakage Power Ratio). The signal analyzer may e.g. be a dedicated signal analyzer, like e.g. the "Rohde&Schwarz FSW Signal- and Spectrum Analyzer" or the "Rohde&Schwarz FSMR Measuring Receiver".

In a possible embodiment, the test processing unit may comprise an outgoing signal evaluation unit for evaluating if the received first outgoing test signal comprises a signal level within a first predefined outgoing signal level range and if the received second outgoing test signal comprises a signal level within a second predefined outgoing signal level range. The outgoing signal evaluation unit may perform the evaluation based on a signal information received from the device under test regarding the signal levels of an emitted first outgoing test signal as received by the device under test with the first radiation pattern set and an emitted second outgoing test signal as received by the device under test with the second radiation pattern set.

The outgoing signal evaluation unit may e.g. comprise a processing device that may e.g. comprise D/A converters for generating the outgoing test signals to be emitted by the test antenna system to the device under test. The device under test may e.g. provide a signal information in a data signal or an analogue signal that characterizes at least the signal levels as received by the DUT.

If the DUT is only an antenna array, evaluation means may be provided to evaluate the signal levels at the single antenna elements. For example, level meters may be provided that measure the signal levels of the outgoing test signals as received at the antenna arrays and provide a respective indication to the processing device. It is understood, that this indication may be a digital signal or an analogue signal that may be received by the processing device via A/D-converters. Alternatively the antenna elements may be coupled to the A/D-converters without the level meters.

Summing up, the outgoing signal evaluation unit may be thought of as performing the same functions as the incoming signal evaluation unit but for the outgoing test signals as received by the DUT.

First it may be verified if the receiving signal level at the expected maximum of the main lobe with the first radiation pattern set is within a predetermined outgoing signal level range. With this first test it may be tested if the main lobe is correctly positioned. If the antenna array is for example badly calibrated and phase shifts are present in signals for the single antenna elements, the main lobe may be shifted, even with the first radiation pattern set.

It may then be verified if e.g. the first null, i.e. the null between the main lobe and the first side lobe, is at the expected position. This may be tested by setting the second radiation pattern in the DUT. With the second radiation pattern set, a minimum outgoing signal level is expected to be measured. Should this signal level not be as expected, e.g. higher than expected, this is an indication that either the shape of the main lobe is modified or that the radiation pattern is not rotated as expected. These errors may e.g. occur due to wrong phase shifts in the signals for the single antenna elements.

Although above the first and second incoming signal level ranges and the first and second outgoing signal level ranges are introduced as ranges, it is understood, that these ranges may also include a single threshold value and it may be tested if the respective signal level is either higher or lower than the respective threshold value, i.e. in a range above or below the respective threshold value.

In a possible embodiment, the test processing unit may comprise an outgoing signal processor coupled to the test antenna system for generating and emitting a first outgoing test signal emitted to the device under test with the first radiation pattern set and for generating and emitting a second outgoing test signal emitted to the device under test with the second radiation pattern set.

The test processing unit may comprise an outgoing signal processor that may complement or substitute the outgoing signal evaluation unit. The outgoing signal evaluation unit may e.g. be implemented in the outgoing signal processor at least in part. The outgoing signal processor may e.g. comprise instructions to perform the level determination for the first and the second outgoing test signals and compare the signal levels with the threshold values or ranges. The outgoing signal processor may however perform additional evaluations or calculations on the received outgoing signals.

The outgoing signal processor may e.g. comprise a signal analyzer that may e.g. determine an EVM (Error Vector Magnitude), a Gain, a EiRP (Equivalent isotropically Radiated Power), an EiS (Effective Isotropic Sensitivity) and/or an ACLR (Adjacent Channel Leakage Power Ratio). The signal analyzer may e.g. be a dedicated signal analyzer, like e.g. the "Rohde&Schwarz FSW Signal- and Spectrum Analyzer" or the "Rohde&Schwarz FSMR Measuring Receiver".

It is understood, that the incoming signal evaluation unit, the incoming signal processor, the outgoing signal evaluation unit and the outgoing signal processor may be implemented in a single device, e.g. one of the above named signal analyzers. These devices may also be implemented as a combination of a signal analyzer and other required hardware.

In a possible embodiment, the test antenna system may emit plane waves, and the device under test may be positioned in a quiet zone formed by the plane waves emitted by the antenna system.

It is understood, that the test antenna system may comprise a single antenna or a plurality of antennas as required for the respective tests. The test antenna system may also comprise e.g. a plane wave generator. Such a generator may e.g. comprise a reflector and/or a RF hologram that guide and modify the radiated waves accordingly. In compact range, the plane wave volume is called quiet-zone. General criteria for the quiet-zone may e.g. comprise an amplitude ripple of ±0.5 dB peak-to-peak and a phase ripple of ±5° peak-to-peak.

In a possible embodiment, the test system may comprise a positioning device for positioning the device under test in at least one axis.

Positioning in this context may refer to a translational or a rotational movement. The positioning device may e.g. comprise an electric motor or a threaded spindle with a respective slide. With the positioning device the device under test may e.g. be rotated relative to the test antenna system. This allows performing the measurements from different directions.

In a possible embodiment, the test system may comprise a jamming signal generator for generating a jamming signal at least temporarily when the second radiation pattern is set in the DUT.

Modern communication devices, like e.g. 3GPP communication devices, comprise beamforming algorithms that will automatically rotate the radiation pattern or change the shape of the radiation pattern if a jamming signal is present. Jamming signal in this context may refer to any signal that may interfere with the communication of the respective device.

By generating and emitting such a jamming signal, the test system may force such a device under test to perform a beamforming or beamsteering. Therefore, with the jamming signal the beamforming and beamsteering algorithms in the device under test may be evaluated.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
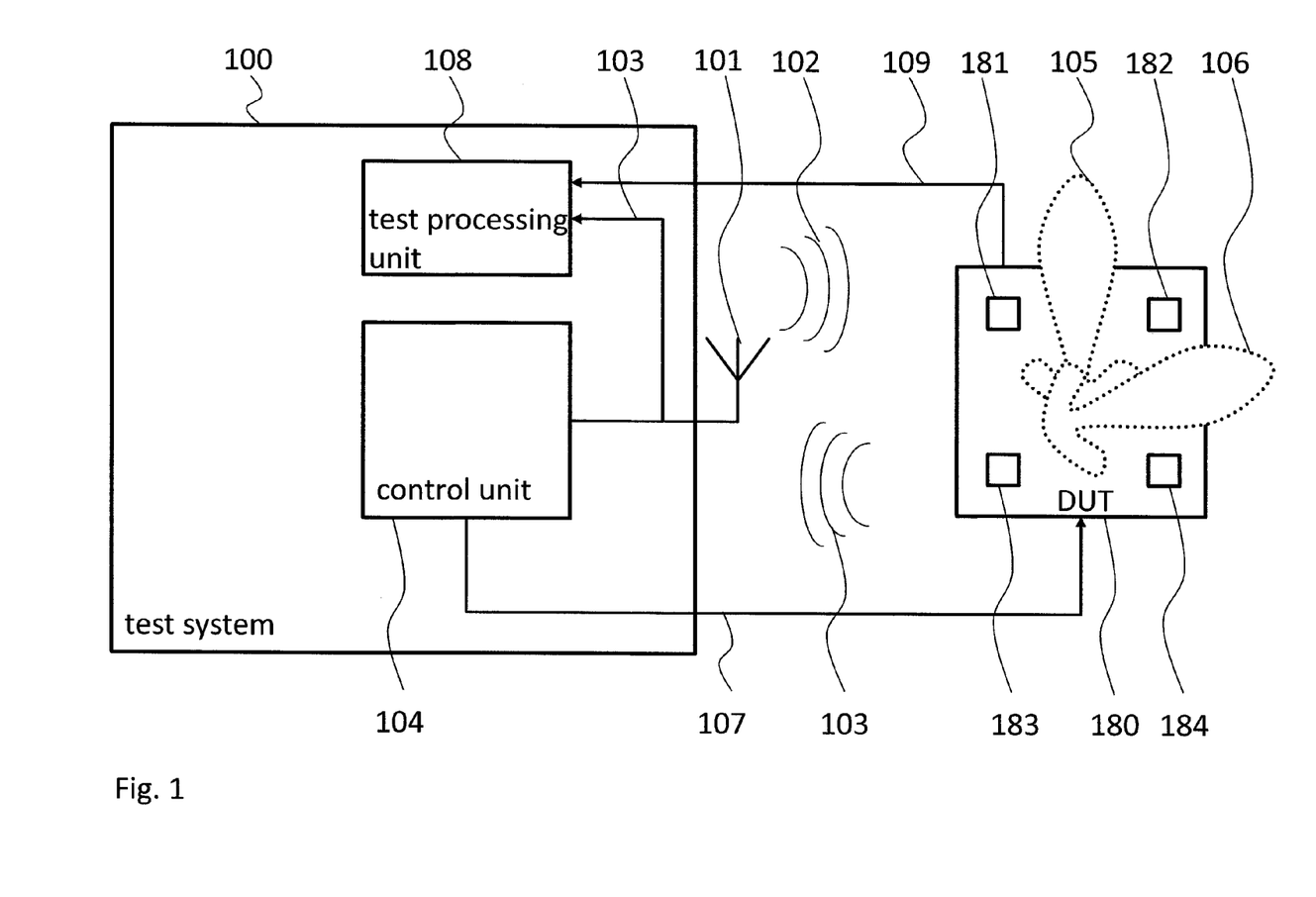
FIG. 1 shows a block diagram of an embodiment of a test system according to the present invention.

FIG. 1 shows a block diagram of a test system 100. The test system 100 comprises a test antenna system 101, shown as single antenna. The test system 100 further comprises a control unit 104 that is coupled to the test antenna system 101 and a device under test 180. Finally, the test system 100 comprises a test processing unit 108 that is coupled to the device under test 180 and to the test antenna system 101.

The device under test 180 comprises an antenna array with antenna elements 181, 182, 183, 184. It is understood that the four antenna elements 181, 182, 183, 184 are only exemplary shown and that the antenna array may comprise any number of antenna elements. The device under test 180 may e.g. be a carrier with antenna elements only, or e.g. a device comprising digital elements in addition to the antenna elements 181, 182, 183, 184, like e.g. a mobile phone or the like. With the antenna elements 181, 182, 183, 184 it is possible to generate different radiation patterns if the single antenna elements 181, 182, 183, 184 are controlled accordingly.

The control unit 104 may e.g. control the device under test 180 to generate respective radiation patterns. A first radiation pattern 105 may have a theoretical main lobe pointing to the test antenna system 101. A second radiation pattern 106 may have a theoretical null between the main lobe and a side lobe pointing to the test antenna system 101. This means that with the first radiation pattern 105 set, the test antenna system 101 should receive a maximum signal level. In contrast, with the second radiation pattern 106 the test antenna system 101 should receive a minimum signal level.

During a test the control unit 104 may therefore control the device under test 180 to first set the first radiation pattern 105. The test processing unit 108 will then measure either the signal level of an incoming test signal 103 received from the device under test 180 or an outgoing test signal 102 sent to the device under test 180 via the test antenna system 101. The test system 100, e.g. the control unit 104 or the test processing unit 108, may comprise respective signal generators for generating the outgoing test signal 103.

If the device under test 180 is only a carrier with antenna elements 181, 182, 183, 184 the signal generator may also generate the incoming test signal 103. The generated incoming test signal 103 may then be provided to the device under test 180 for emission to the test antenna system 101. If the device under test 180 is a complex device, like e.g. a mobile phone, the control unit 104 may provide a control signal 107 to the device under test 180. The control signal 107 may then initiate signal generation of the incoming test signal 103 in the device under test 180.

The test processing unit 108 may receive the incoming test signal 103 from the test antenna system 101. In addition or as alternative, the test processing unit 108 may also receive signal information 109 from the device under test 180. The signal information 109 may characterize the signals received by the device under test 180.

The test processing unit 108 may then evaluate if signal levels of the incoming test signals 103 received by the test antenna system 101 from the device under test 180 are within a predetermined signal level range. Further the test processing unit 108 may evaluate if signal levels of the outgoing test signals 102 as received by the device under test 180 are within a respective predetermined signal level range.

The evaluation results may then be output by the test processing unit 108, e.g. to a user or a superordinate control device. Especially in production lines, the evaluation results of the single devices under test 180 may e.g. be provided to a production control system that may then automatically sort out defective devices under test 180 or perform any other adequate action.

Figure 2:
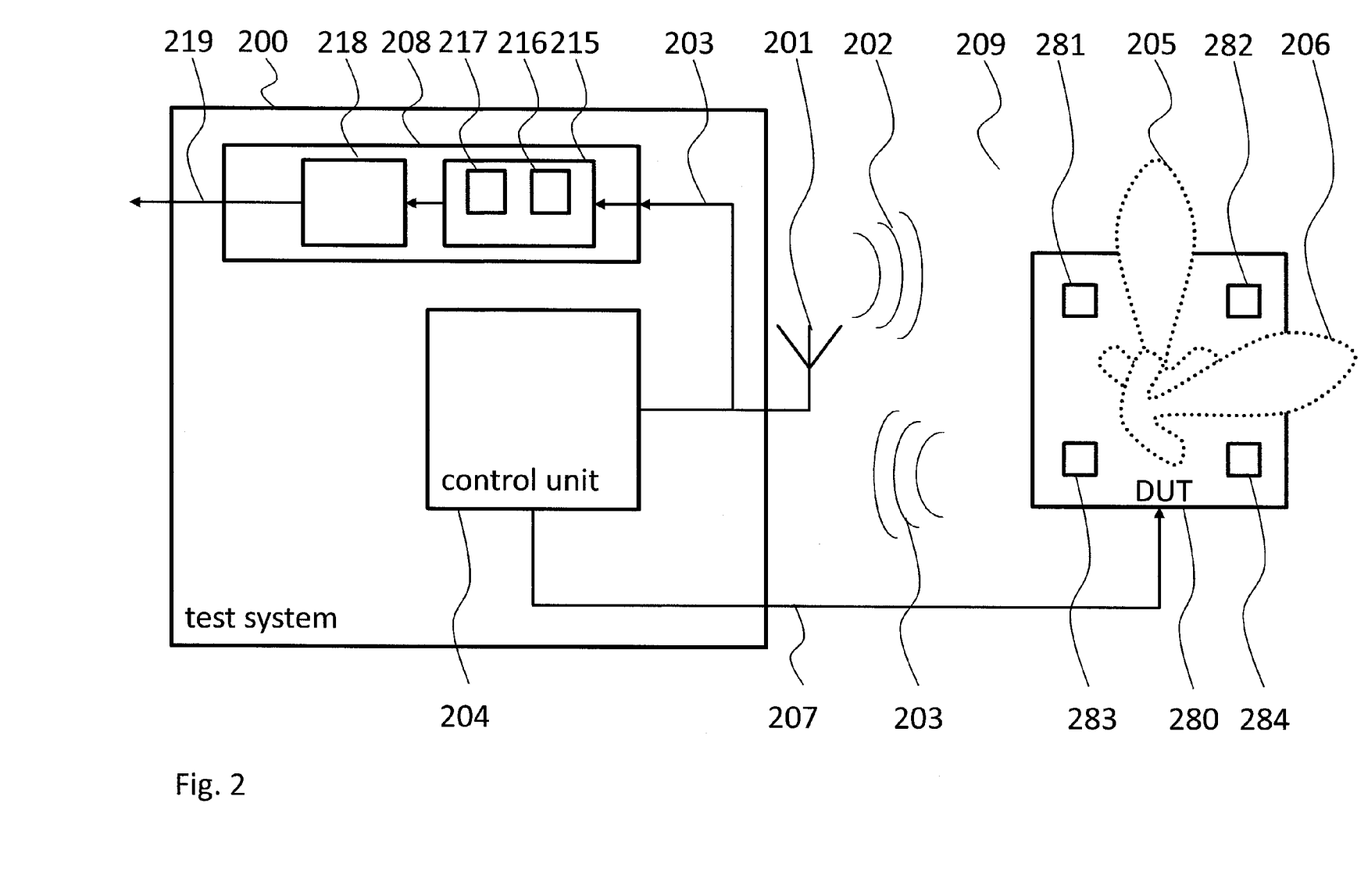
FIG. 2 shows a block diagram of another embodiment of a test system according to the present invention.

FIG. 2 shows a block diagram of a test system 200. The test system 200 is based on the test system 100. The test system 200 therefore also comprises the test antenna system 201, shown as single antenna, the control unit 204 that is coupled to the test antenna system 201 and a device under test 280, and the test processing unit 208 that is coupled to the test antenna system 201.

In the test system 200 the test processing unit 208 is especially configured to process incoming test signals 203. The test processing unit 208 therefore comprises an incoming signal evaluation unit 215 that receives the incoming test signal 203 and is coupled to an incoming signal processor 218.

The incoming signal evaluation unit 215 may verify if a received first incoming test signal 203 with the first radiation pattern 205 set on the device under test 280 comprises a signal level within a first predefined incoming signal level range 216. The incoming signal evaluation unit 215 may further verify if a received second incoming test signal 203 with the second radiation pattern 206 set comprises a signal level within a second predefined incoming signal level range 217. The signal ranges 216, 217 may each specify a single value that may be the respective upper or lower threshold of the respective range 216, 217. In this case the incoming signal evaluation unit 215 will verify if the level of the received incoming test signal 203 is higher or lower than the respective threshold.

In addition to this analysis by the incoming signal evaluation unit 215 the incoming signal processor 218 may perform further analysis on the incoming test signal 203. The incoming signal processor 218 may e.g. calculate an EVM (Error Vector Magnitude), a Gain, an EiRP (Equivalent isotropically Radiated Power), an EiS (Effective Isotropic Sensitivity) and/or an ACLR (Adjacent Channel Leakage Power Ratio). The incoming signal processor 218 will then output respective characterizing data 219 regarding the incoming test signal 203 that comprises the results of the above analysis.

The incoming signal evaluation unit 215 and/or the incoming signal processor 218 may e.g. be implemented in a signal analyzer, like e.g. the "Rohde&Schwarz FSW Signal- and Spectrum Analyzer" or the "Rohde&Schwarz FSMR Measuring Receiver".

Figure 3:
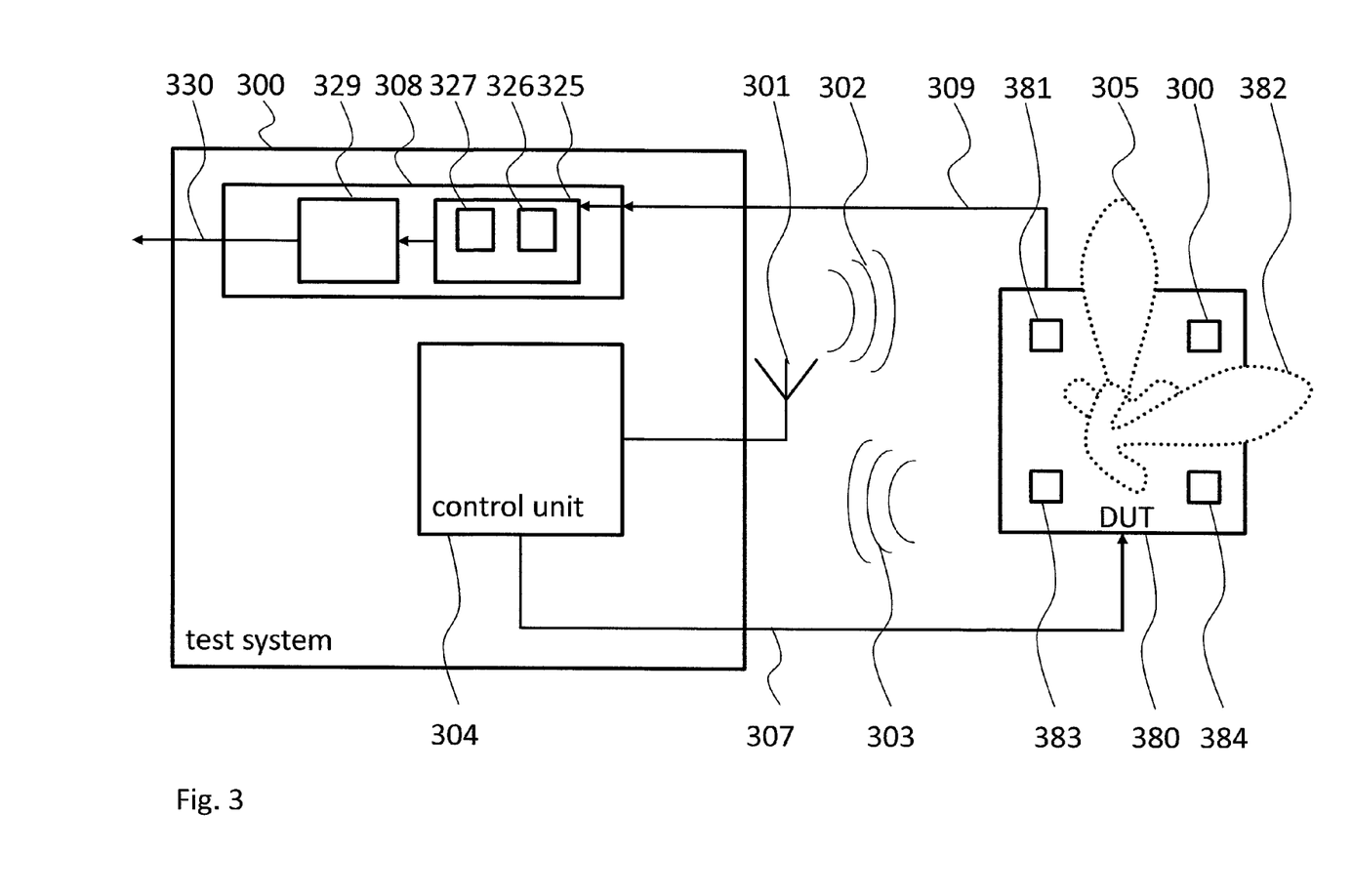
FIG. 3 shows a block diagram of another embodiment of a test system according to the present invention.

FIG. 3 shows a block diagram of another test system 300. The test system 300 is also based on the test system 100. The test system 300 therefore also comprises the test antenna system 301, shown as single antenna, the control unit 304 that is coupled to the test antenna system 301 and a device under test 380, and the test processing unit 308 that is coupled to the device under test 380.

In the test system 300 the test processing unit 308 is especially configured to process outgoing test signals 302 as they are received by the device under test 380 and reported or measured via the signal information 309. The test processing unit 308 therefore comprises an outgoing signal evaluation unit 325 that receives the outgoing test signal 302 or information about the outgoing test signal 302 indirectly via the signal information 309 and is coupled to an outgoing signal processor 318.

The outgoing signal evaluation unit 325 may verify if a received first outgoing test signal 302 with the first radiation pattern 305 set on the device under test 380 comprises a signal level within a first predefined outgoing signal level range 326. The outgoing signal evaluation unit 325 may further verify if a received second outgoing test signal 302 with the second radiation pattern 306 set comprises a signal level within a second predefined outgoing signal level range 327. The signal ranges 326, 327 may each specify a single value that may be the respective upper or lower threshold of the respective range 326, 327. In this case the outgoing signal evaluation unit 325 will verify if the level of the received outgoing test signal 302 is higher or lower than the respective threshold.

In addition to this analysis by the outgoing signal evaluation unit 325 the outgoing signal processor 329 may perform further analysis on the outgoing test signal 302. The outgoing signal processor 329 may e.g. calculate an EVM (Error Vector Magnitude), a Gain, an EiRP (Equivalent isotropically Radiated Power), an EiS (Effective Isotropic Sensitivity) and/or an ACLR (Adjacent Channel Leakage Power Ratio). The outgoing signal processor 329 will then output respective characterizing data 330 regarding the outgoing test signal 302 that comprises the results of the above analysis.

The outgoing signal evaluation unit 325 and/or the outgoing signal processor 329 may e.g. be implemented in a signal analyzer, like e.g. the "Rohde&Schwarz FSW Signal- and Spectrum Analyzer" or the "Rohde&Schwarz FSMR Measuring Receiver".

It is understood, that the embodiments shown above, especially of FIG. 2 for processing the incoming test signals 103, 203, 303 and of FIG. 3 for processing the outgoing test signals 102, 202, 203, may be combined into a single test system 100 and that single features of the shown embodiments may be freely combined.

Figure 4:
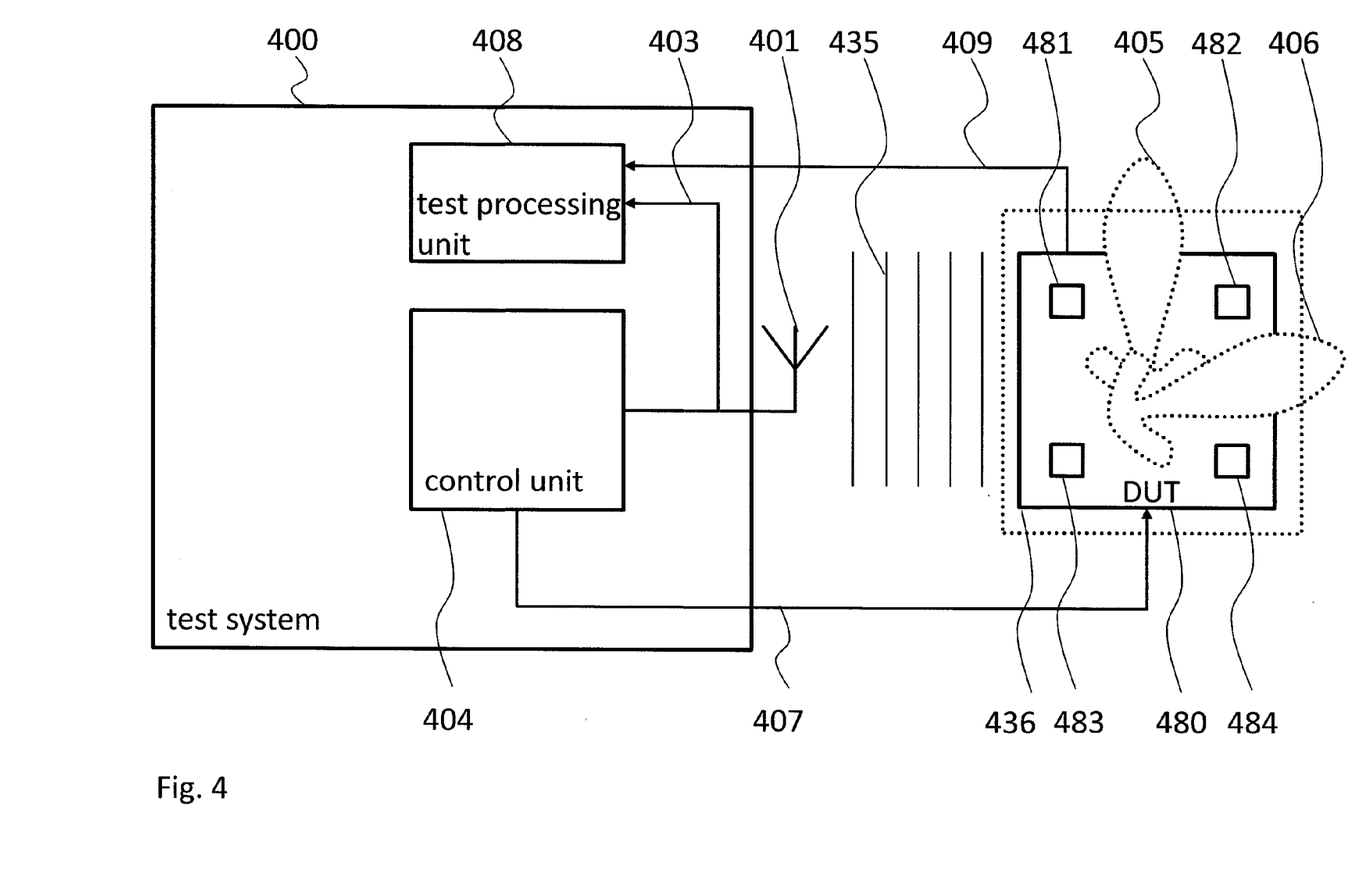
FIG. 4 shows a block diagram of another embodiment of a test system according to the present invention.

FIG. 4 shows a block diagram of another test system 400. The test system 400 equals the test system 100 but for the test antenna system 401, that in the test system 400 provides plane waves 435. Further, the device under test 480 is placed in a quiet zone 436 with respect to the plane waves 435.

The above said with regard to FIGS. 1-3 is therefore also valid for FIG. 4 mutatis mutandis.

For sake of clarity in the following description of the method based FIG. 5 the reference signs used above in the description of apparatus based FIGS. 1-4 will be maintained.

Figure 5:
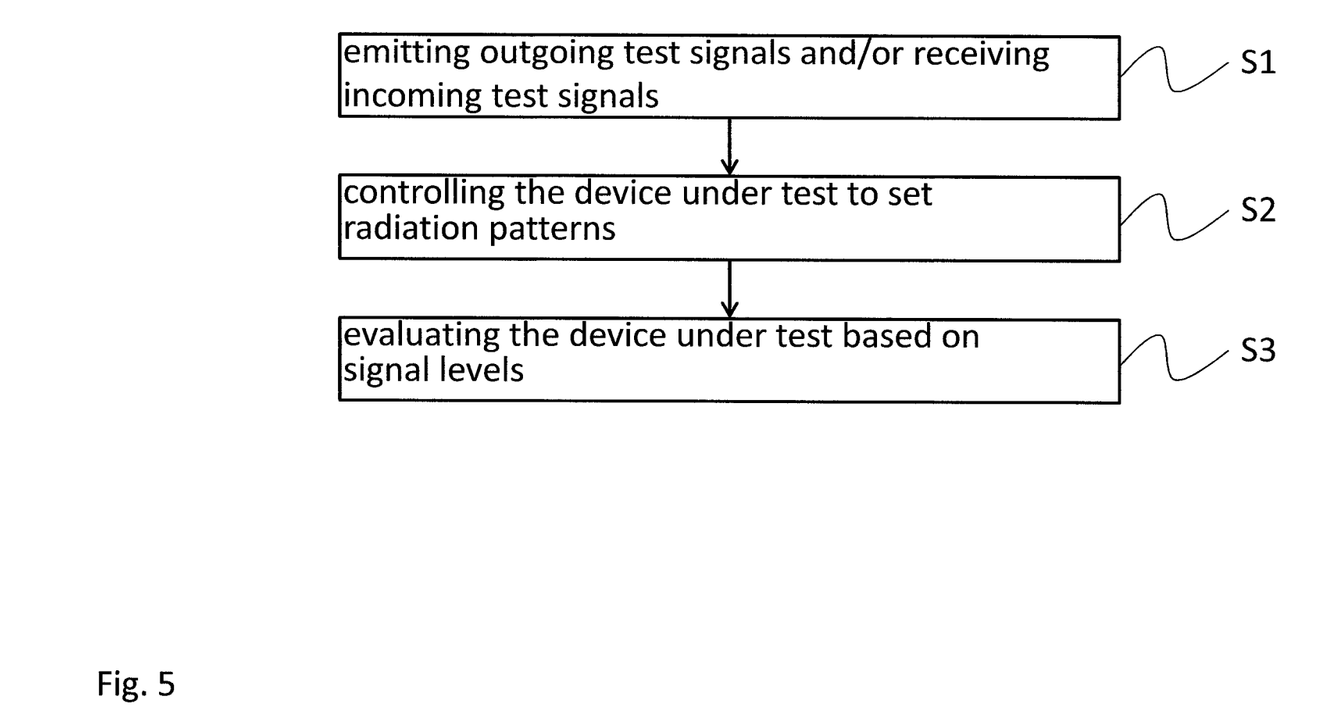
FIG. 5 shows a flow diagram of an embodiment of a test method according to the present invention.

FIG. 5 shows a flow diagram of an embodiment of a test method for testing a device under test 180, 280, 380, 480 comprising an antenna array with multiple antennas or antenna elements 282, 283, 284, 285, 382, 383, 384, 385, 482, 483, 484, 485 and capable of controlling a radiation pattern of the antenna array.

The test method comprises emitting S1 outgoing test signals 102, 202, 302, 402 to the device under test 180, 280, 380, 480 and/or receiving incoming test signals 103, 203, 303, 403 from the device under test 180, 280, 380, 480 with a test antenna system 101, 201, 301, 401. The test method further comprises controlling S2 the device under test 180, 280, 380, 480 to set a first radiation pattern 105, 205, 305, 405 with a theoretical main lobe pointing to the test antenna system 101, 201, 301, 401 or to set a second radiation pattern 106, 206, 306, 406 with a theoretical null between the main lobe and a side lobe pointing to the test antenna system 101, 201, 301, 401. Finally, the method comprises evaluating S3 the device under test 180, 280, 380, 480 based on signal levels of incoming test signals 103, 203, 303, 403 received by the test antenna system 101, 201, 301, 401 from the device under test 180, 280, 380, 480 and/or based on signal levels of outgoing test signals 102, 202, 302, 402 as received by the device under test 180, 280, 380, 480.

Evaluating S3 may comprise verifying if a received first incoming test signal 103, 203, 303, 403 with the first radiation pattern 105, 205, 305, 405 set comprises a signal level within a first predefined incoming signal level range 216. Evaluating S3 may further comprise verifying if a received second incoming test signal 103, 203, 303, 403 with the second radiation pattern 106, 206, 306, 406 set comprises a signal level within a second predefined incoming signal level range 216.

In addition evaluating S3 may comprise processing the first incoming test signal 103, 203, 303, 403 and processing the second incoming test signal 103, 203, 303, 403. Processing may e.g. comprise calculating an EVM and/or a Gain and/or an EiRP and/or an EiS and/or an ACLR for the incoming test signals 103, 203, 303, 403.

Further, evaluating S3 may comprise evaluating if the received first outgoing test signal 102, 202, 302, 402 comprises a signal level within a first predefined outgoing signal level range 326. Evaluating S3 may further comprise verifying if the received second outgoing test signal 102, 202, 302, 402 comprises a signal level within a second predefined outgoing signal level range 327.

Evaluating S3 may be performed based on a signal information 109, 209, 309, 409 regarding the signal levels of an emitted first outgoing test signal 102, 202, 302, 402 as received by the device under test 180, 280, 380, 480 with the first radiation pattern 105, 205, 305, 405 set and an emitted second outgoing test signal 102, 202, 302, 402 as received by the device under test 180, 280, 380, 480 with the second radiation pattern 106, 206, 306, 406 set.

In addition or as alternative, evaluating S3 may comprise generating and emitting a first outgoing test signal 102, 202, 302, 402 emitted to the device under test 180, 280, 380, 480 with the first radiation pattern 105, 205, 305, 405 set and generating and emitting a second outgoing test signal 102, 202, 302, 402 emitted to the device under test 180, 280, 380, 480 with the second radiation pattern 106, 206, 306, 406 set.

Emitting S3 may also comprise emitting plane waves. The device under test 180, 280, 380, 480 may be positioned in a quiet zone formed by the plane waves emitted by the antenna system.

Further, the method may comprise positioning the device under test 180, 280, 380, 480 in at least one axis relative to the test antenna system 101, 201, 301, 401. In addition, the method may comprise generating a jamming signal at least temporarily when the second radiation pattern 106, 206, 306, 406 is set in the DUT.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300, 400 test system
101, 201, 301, 401 test antenna system
102, 202, 302, 402 outgoing test signal
103, 203, 303, 403 incoming test signal
104, 204, 304, 404 control unit
105, 205, 305, 405 first radiation pattern
106, 206, 306, 406 second radiation pattern
107, 207, 307, 407 control signal
108, 208, 308, 408 test processing unit
109, 209, 309, 409 signal information
215 incoming signal evaluation unit
216 first predefined incoming signal level range
217 second predefined incoming signal level range
218 incoming signal processor
219 characterizing data
325 outgoing signal evaluation unit
326 first predefined outgoing signal level range
327 second predefined outgoing signal level range
329 outgoing signal processor
330 characterizing data
435 plane waves
436 quiet zone
180, 280, 380, 480 device under test
282, 283, 284, 285 antenna elements
382, 383, 384, 385 antenna elements
482, 483, 484, 485 antenna elements
S1-S3 method steps

The invention claimed is:

1. A test system for testing a device under test comprising an antenna array with multiple antennas and capable of controlling a radiation pattern of the antenna array, the test system comprising:
   a test antenna system for emitting outgoing test signals to the device under test and receiving incoming test signals from the device under test,
   a control unit for controlling the device under test to set a first radiation pattern with a theoretical main lobe pointing to the test antenna system or to set a second radiation pattern with a main lobe comprising an angle larger than 0° with the main lobe of the first radiation pattern, and
   a test processing unit for evaluating the device under test based on signal levels of incoming test signals received by the test antenna system from the device under test and/or based on signal levels of outgoing test signals as received by the device under test,
   wherein the test processing unit comprises an incoming signal evaluation unit for verifying if a received first incoming test signal with the first radiation pattern set comprises a signal level within a first predefined incoming signal level range and if a received second incoming test signal with the second radiation pattern set comprises a signal level within a second predefined incoming signal level range.

2. The test system according to claim 1, wherein the second radiation pattern comprises a theoretical null between the main lobe and a side lobe pointing to the test antenna system.

3. The test system according to claim 1, wherein the test processing unit comprises an incoming signal processor coupled to the test antenna system for processing the first incoming test signal and for processing the second incoming test signal.

4. The test system according to claim 1, wherein the test processing unit comprises an outgoing signal evaluation unit for evaluating if the received first outgoing test signal comprises a signal level within a first predefined outgoing signal level range and if the received second outgoing test signal comprises a signal level within a second predefined outgoing signal level range,
   wherein the outgoing signal evaluation unit performs the evaluation based on a signal information received from the device under test regarding the signal levels of an emitted first outgoing test signal as received by the device under test with the first radiation pattern set and an emitted second outgoing test signal as received by the device under test with the second radiation pattern set.

5. The test system according to claim 4, wherein the test processing unit comprises an outgoing signal processor coupled to the test antenna system for generating and emitting a first outgoing test signal emitted to the device under test with the first radiation pattern set and for generating and emitting a second outgoing test signal emitted to the device under test with the second radiation pattern set.

6. The test system according to claim 1, wherein the test antenna system emits plane waves, and wherein the device under test is positioned in a quiet zone formed by the plane waves emitted by the antenna system.

7. The test system according to claim 1, comprising a positioning device for positioning the device under test in at least one axis.

8. The test system according to claim 1, comprising a jamming signal generator for generating a jamming signal at least temporarily when the second radiation pattern is set in the DUT.

9. A test method for testing a device under test comprising an antenna array with multiple antennas and capable of controlling a radiation pattern of the antenna array, the test method comprising:
 emitting outgoing test signals to the device under test and/or receiving incoming test signals from the device under test with a test antenna system,
 controlling the device under test to set a first radiation pattern with a theoretical main lobe pointing to the test antenna system or to set a second radiation pattern with a main lobe comprising an angle larger than 0° with the main lobe of the first radiation pattern, and
 evaluating the device under test based on signal levels of incoming test signals received by the test antenna system from the device under test and/or based on signal levels of outgoing test signals as received by the device under test,
 wherein evaluating comprises verifying if a received first incoming test signal with the first radiation pattern set comprises a signal level within a first predefined incoming signal level range and if a received second incoming test signal with the second radiation pattern set comprises a signal level within a second predefined incoming signal level range.

10. The test method according to claim 9, wherein the second radiation pattern comprises a theoretical null between the main lobe and a side lobe pointing to the test antenna system.

11. The test method according to claim 9, wherein evaluating comprises processing the first incoming test signal and processing the second incoming test signal, especially calculating an EVM and/or a Gain and/or an EiRP and/or an EiS and/or an ACLR.

12. The test method according to claim 9, wherein evaluating comprises evaluating if the received first outgoing test signal comprises a signal level within a first predefined outgoing signal level range and if the received second outgoing test signal comprises a signal level within a second predefined outgoing signal level range,
 wherein the evaluation is performed based on a signal information regarding the signal levels of an emitted first outgoing test signal as received by the device under test with the first radiation pattern set and an emitted second outgoing test signal as received by the device under test with the second radiation pattern set.

13. The test method according to claim 12, wherein evaluating comprises generating and emitting a first outgoing test signal emitted to the device under test with the first radiation pattern set and for generating and emitting a second outgoing test signal emitted to the device under test with the second radiation pattern set.

14. The test method according to claim 9, wherein emitting comprises emitting plane waves, and wherein the device under test is positioned in a quiet zone formed by the plane waves emitted by the antenna system.

15. The test method according to claim 9, comprising positioning the device under test in at least one axis.

16. The test method according to claim 9, comprising generating a jamming signal at least temporarily when the second radiation pattern is set in the DUT.

* * * * *